J. IRVING.
PROCESS FOR THE TREATMENT OF ORES.
APPLICATION FILED JULY 20, 1911.
1,048,541.
Patented Dec. 31, 1912.
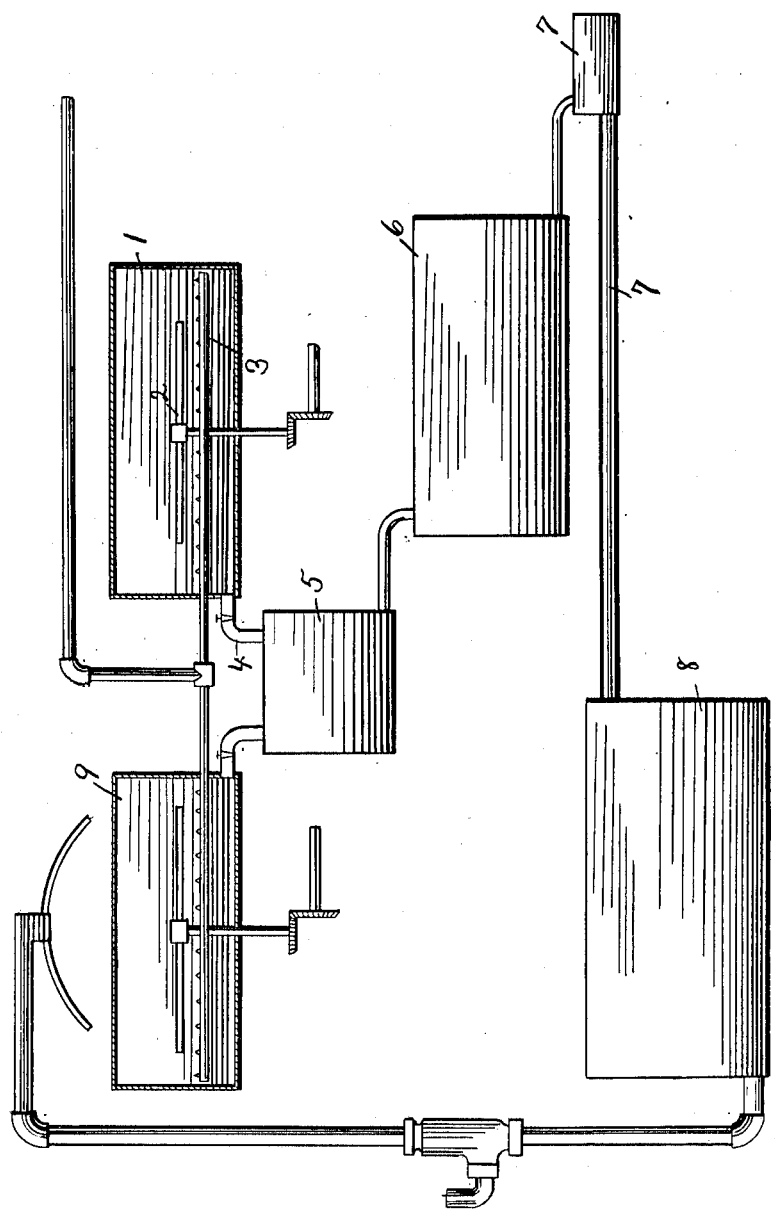
WITNESSES:
BY
INVENTOR
Joseph Irving
*Attorney*

UNITED STATES PATENT OFFICE.

JOSEPH IRVING, OF SALT LAKE CITY, UTAH.

PROCESS FOR THE TREATMENT OF ORES.

1,048,541.      Specification of Letters Patent.      Patented Dec. 31, 1912.

Application filed July 20, 1911. Serial No. 639,660.

*To all whom it may concern:*

Be it known that I, JOSEPH IRVING, a subject of Great Britain, residing at Salt Lake City, in the county of Salt Lake, State of Utah, have invented certain new and useful Improvements in Processes for the Treatment of Ores, of which the following is a description, reference being had to the accompanying drawings, forming a part hereof.

My invention relates to processes for the treatment of ores, particularly ores carrying precious metals with copper.

My invention has for its object to provide a process of treatment of such ores in the raw state, that is, without preliminary roasting or other treatment other than being pulverized, which shall be effective and at the same time be inexpensive, a particular feature of the invention being the utilization for this treatment of such ores of the tailing or end liquors containing ferrous sulfate, which would ordinarily be thrown away.

With these objects in view, my invention consists in the process hereinafter described and particularly pointed out in the claims.

The drawing accompanying this specification illustrates diagrammatically an arrangement of apparatus for carrying out the process.

In applying my process to the recovery of gold, silver and copper from ores, I first take say five tons of a two per cent. copper carbonate ore ground to a sixteen mesh and place it in leaching tank 1, which is provided with a stirrer 2 and perforated steam pipes 3, and introduce fifteen hundred gallons of water mixed with fifteen gallons of sulfuric acid (sp. gr. 1.84). This solution should be added slowly to the mass of pulverized ore, preferably by spraying it well over the surface of the ore in the tank by means of small launders or otherwise. Steam is then forced into the tank through the steam pipe 3 and the stirrer 2 is set in operation. This is kept up for say two hours, the ore in the tank being kept hot and in constant agitation so as to bring the sulfuric acid solution into contact with every particle of the ore. After being thus subjected to heat and agitation for the period mentioned, the contents of the tank are allowed to settle, and the liquor now containing the copper in solution is drained off through outlet 4 into a filter tank 5 containing some sand and fine iron pyrites, from which it passes to a settling tank 6. The ore in the tank 1 is then again treated with sulfuric acid solution of substantially the same strength and in substantially the same quantity as before, and is subjected to heat and agitation as before, and the resulting liquor is drained off after settling, filtered and run into the settling tank 6. These two treatments of the ore will extract most of the copper from the ore, but in order to extract all the copper possible, I subject the ore in the tank to two washings of plain water with heat and agitation as before, running the liquor from these washings, as before, through the filter tank 5 into settling tank 6. The liquor in the settling tank carrying the copper in solution is then, while still warm, run through tanks or canals 7, which are loaded with metals more electro-positive than the copper, gold and silver such as metallic iron and zinc in the form of sheets, strips, turnings or other scrap, upon which the copper will be quickly deposited, the iron displacing the copper from the solution, so that the liquor becomes a ferrous sulfate solution.

From the tanks or canals 7 the liquor runs to a convenient settling tank or sump 8, as tailing or end liquor. I then take say five tons of a two per cent. copper ore, such as carbonate and chalcocite containing an appreciable amount of gold and silver, place it in a leaching tank 9, here shown as a separate tank, though tank 1 may be used if desired, and spray over it, say seven hundred gallons of the tailing or end liquor from the sump, which has in the meantime been well agitated to cause the ferrous sulfate contained in it to change to ferric sulfate. This change is made complete by using a steam injector to raise the liquid from the sump to the leaching tank. After this liquor has soaked into the ore in the tank, I spread about five hundred pounds of common salt (NaCl) over the surface of the ore in the tank, and then spray over the salt another seven hundred gallons of the tailing or end liquor from the sump. The ferric sulfate in solution in the liquor from the sump reacts to a greater or less extent with the salt to form ferric chlorid and sodium sulfate, the reaction being expressed in the equation—

$$Fe_2(SO_4)_3 + 6NaCl = Fe_2Cl_6 + 3Na_2SO_4.$$

A portion of the ferric sulfate remains as such in the solution and the ferric sulfate and ferric chlorid act upon the ore to not only dissolve out the copper, but to also at the same time dissolve out the gold and silver present.

After the second quantity of tailing or end liquor has been added to the ore in tank 9, the contents of the tank are heated and agitated as in the first part of the process, for about two hours, then allowed to settle. The liquor now carrying copper, gold and silver in solution as sulfate and chlorid of copper and chlorid of gold, and chlorid of silver is run off through the filter tank 5 to settling tank 6, and from settling tank 6 through the tanks and canals 7 containing metallic iron, and zinc where the copper, gold and silver are displaced by the iron, and zinc and into the sump 8.

The ore in tank 9 is then treated with about fifteen hundred gallons of water containing fifteen gallons of sulfuric acid, and subjected to heat and agitation as before, which will almost complete the extraction of the metals. The liquor from the wash is run through the filter tank 5, settling tank 6, tank and canals 7 into the sump 8, and serves not only to extract most of the metals remaining in the ore after the treatment with the tailing or end liquor, but also serves to keep up the strength of the tailing or end liquor remaining in the sump. In this manner the regeneration of the tailing or end liquor may go on indefinitely, though it may be found necessary in order to fully maintain the strength of the liquor, to add sulfuric acid directly to the liquor in the sump. After thus washing with sulfuric acid solution, the ore in tank 9 is washed with water with heat and agitation, the wash water being lead as before through the filter tank, the settling tank, the tank and canals containing iron and zinc, to the sump.

The end or tailing liquor regenerated by the addition of the sulfuric acid as just above referred to, aided by the action of the steam injector, is found to have a very rapid solvent effect on either carbonate or sulfid ores in the raw state, extracting the gold and silver, as well as the copper.

The gold and silver are recovered simultaneously with the copper, and are generally precipitated as soon as the liquor from the settling tank comes in contact with the iron and zinc scrap. By the use of pyrites in the filter tank, any excess of ferric sulfate is reduced, thus saving unnecessary consumption of metallic iron in the precipitating tank.

In the treatment of flue dust containing say three per cent. copper and some gold and silver, I prepare a solution containing three per cent. sulfuric acid and common salt in the proportion of six parts of salt to one part of acid. This solution is added to the flue dust in a tank and the mass heated and agitated. The resultant liquor is filtered through the sand and pyrites in the filter tank, and the filtered liquor added to the liquor in the settling tank 6. Two washings of the flue dust with this solution and two with water will generally be sufficient, the mass being constantly agitated and heated during the washing operation. From the settling tank the liquor from this treatment of flue dust passes with the other liquors to the precipitating tanks and canals.

The tailing liquors from this treatment of the copper carbonate with sulfuric acid solution first above described, the liquors from the treatment of the carbonate and chalcocite carrying gold and silver as above described, and the liquors from the treatment of the flue dust as above described, may be led into separate sumps, and such of them, either separately or together as may be desired, regenerated by agitation and the use of the steam injector with such addition of sulfuric acid as may be found advisable, may be used in the treatment of ores carrying copper, gold and silver, the important features of the process being the regeneration of the tailing or end liquors, by which the ferrous sulfate formed by the taking up of iron from the precipitating tanks and canals in place of the copper, gold and silver precipitated, into ferric sulfate, which will in part react upon the salt used to form ferric chlorid.

It will of course be understood that the drawings are illustrative merely of apparatus which might be used in carrying out the process, and are not intended to in any way limit the invention, and it will be further understood that the invention is not intended to be restricted to the proportions of the ingredients used in the several operations above described.

Having thus described my invention, what I claim is:

1. A process for the recovery of values from ores carrying precious metals, which consists in treating copper ores with sulfuric acid and water, injecting steam, and mechanically agitating the mass, drawing off the solution and passing the same over a metal electropositive to the copper and precious metals to thereby precipitate the copper; regenerating the end liquors, adding sodium chlorid to a copper ore containing precious metals, subjecting the same to the regenerated end liquors, injecting steam and mechanically agitating the mass, drawing off the resulting solution and passing the same over a metal electro positive to the copper and precious metals to thereby precipitate and recover the copper and precious metals.

2. A process for the recovery of values from ores carrying copper and precious metals, which consists in treating a copper ore with sulfuric acid and water, injecting steam and agitating the mass, drawing off the resulting solution and passing the same over a metal electro positive to the copper and precious metals to thereby precipitate the copper; regenerating the end liquors by agitating and passing the same through a steam injector, adding sodium chlorid to a copper ore containing precious metals, subjecting the same to the regenerated end liquors, injecting steam and mechanically agitating the mass, drawing off the resulting solution and passing the same over a metal electro-positive to the copper and precious metals to thereby precipitate and recover the copper and precious metals.

3. A process for the recovery of precious metals from ores, consisting in taking the end liquors resulting from the action of sulfuric acid solution upon copper ore and the subsequent precipitation of the copper upon iron, said end liquors being composed of ferrous sulfate, ferrous chlorid, sodium sulfate and water; regenerating the tailing or end liquor by agitating and passing the same through a steam injector, subjecting an ore containing precious metals to the action of the regenerated end liquors and sodium chlorid, passing the resulting solution through filters of sand and iron pyrites and over a metal electropositive to copper and the precious metals to thereby precipitate and recover copper and the precious metals.

4. A process for the recovery of precious metals from ores containing copper, consisting in taking the end liquors resulting from the action of sulfuric acid solution upon a copper ore and the subsequent precipitation of the copper upon iron, said end liquors being composed of ferrous sulfate, ferrous chlorid, sodium sulfate and water; regenerating the tailing or end liquor by agitating and passing the same through a steam injector, subjecting said ore containing precious metals to the action of the regenerated end liquors and sodium chlorid, passing the resulting solution through filters of sand and iron pyrites and over a metal electropositive to copper and the precious metals to thereby precipitate and recover copper and the precious metals.

5. A process for the recovery of copper, gold and silver from their ores consisting in treating an ore containing copper with sulfuric acid and water, injecting steam and mechanically agitating the mixture, drawing off the resulting solution, passing the same through filters and sand and iron pyrites, and then over a metal electropositive to the copper and precious metals, thereby precipitating the copper, regenerating the end liquors by stirring and the action of steam, subjecting a copper ore containing gold and silver to the action of the regenerated liquors, adding sodium chlorid to the copper ore containing gold and silver, subjecting the same to the action of the regenerated end liquors, injecting steam and mechanically agitating the mass, filtering the resulting solution and passing it over a metal electropositive to the precious metals to thereby precipitate and recover the copper, gold and silver, reoxidizing the so formed end liquors and adding sulfuric acid thereto to maintain the acid strength of the end liquors, for the treatment of other ores.

This specification signed and witnessed this sixteenth (16) day of June A. D. 1911.

JOSEPH IRVING.

In the presence of—
C. C. PARSONS, Jr.,
GEO. J. CONSTANTINE.